United States Patent [19]

Bair

[11] 4,349,130
[45] Sep. 14, 1982

[54] LIQUID METERING PUMP
[75] Inventor: Scott S. Bair, Atlanta, Ga.
[73] Assignee: Woolfolk Chemical Works, Inc., Fort Valley, Ga.
[21] Appl. No.: 126,541
[22] Filed: Mar. 3, 1980
[51] Int. Cl.³ .............................................. B67D 5/56
[52] U.S. Cl. ................................ 222/129.2; 222/136; 222/309; 222/334
[58] Field of Search ................... 222/129.2, 133, 134, 222/136, 145, 190, 309, 334, 339, 380, 383; 91/346

[56] References Cited
U.S. PATENT DOCUMENTS

| | | | |
|---|---|---|---|
| 2,443,568 | 6/1948 | Palm | 91/346 X |
| 2,566,436 | 9/1951 | Waite | 222/129.2 X |
| 2,637,304 | 5/1953 | Dinkelkamp | 91/346 X |
| 2,736,466 | 2/1956 | Rodth | 222/129.2 X |
| 2,862,478 | 12/1958 | Staats | |
| 3,205,830 | 9/1965 | Clark | |
| 3,250,247 | 5/1966 | Beaman | |
| 3,640,433 | 2/1972 | Rodth | 222/129.2 |
| 3,799,402 | 3/1974 | Meister et al. | 222/129.2 |
| 3,982,899 | 9/1976 | Kelm | 222/309 X |

Primary Examiner—David A. Scherbel
Attorney, Agent, or Firm—Jones & Askew

[57] ABSTRACT

Metering apparatus combining a motor operated by a first liquid, and a pump driven by the motor to meter a selectably variable volume of a second liquid. The motor has a liquid-operated piston and a shuttle valve to control the flow of operating liquid to the piston. The piston drives a pump actuating rod which, in turn, engages a floating pump piston. The effective stroke of the floating pump piston can be varied to adjust the volume of liquid pumped in response to each cycle of the motor.

14 Claims, 6 Drawing Figures

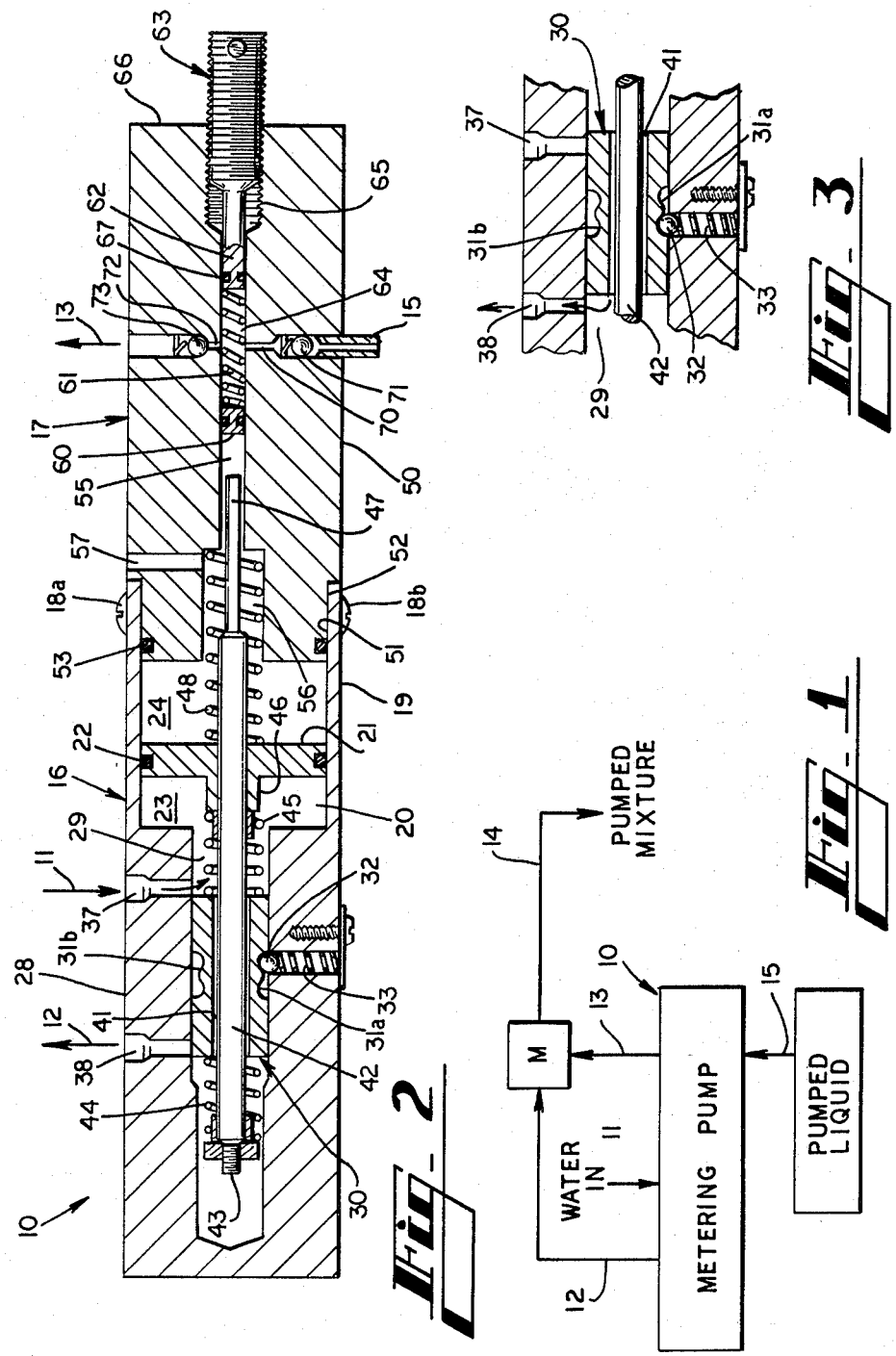

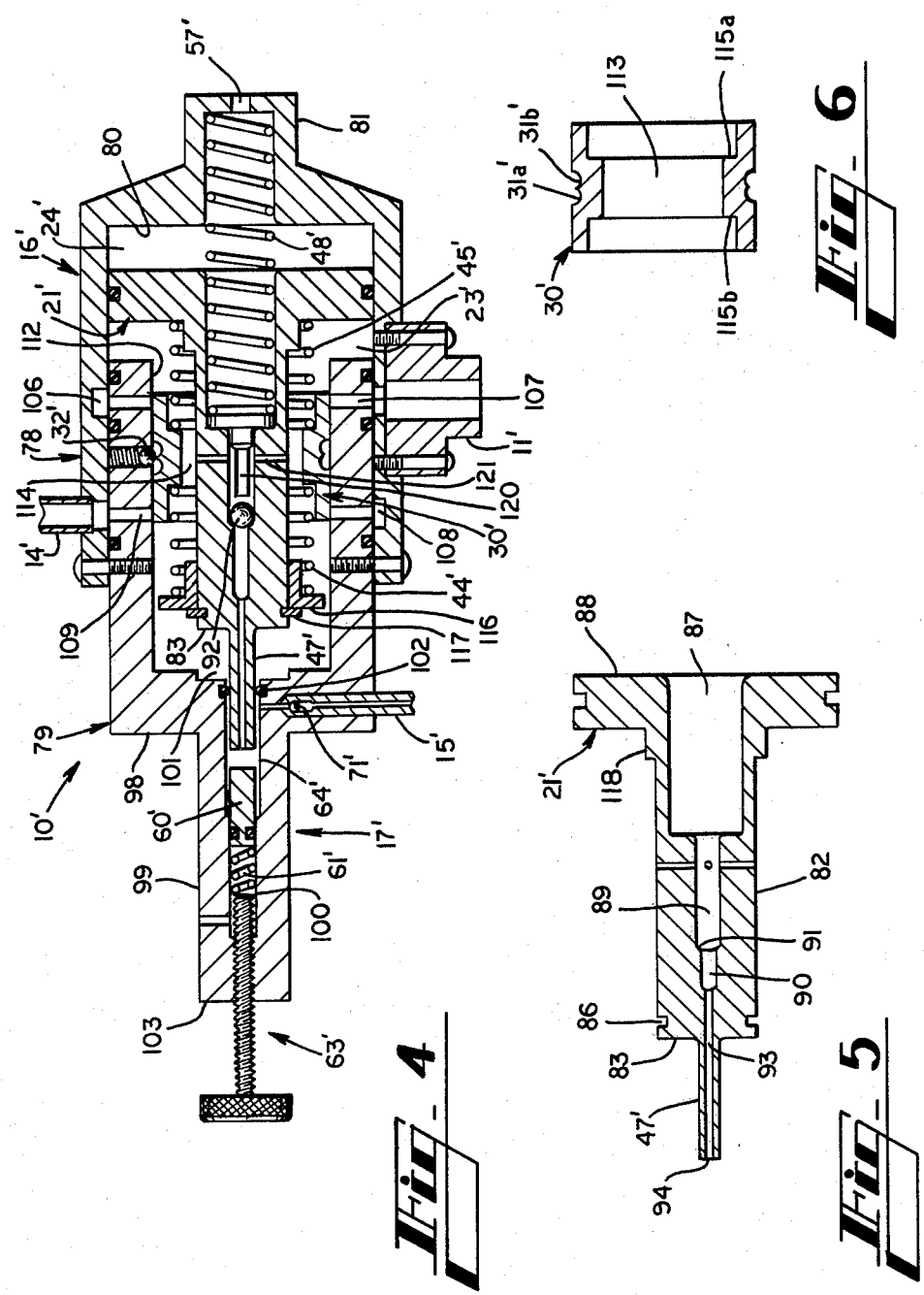

LIQUID METERING PUMP

BACKGROUND OF THE INVENTION

This invention relates in general to apparatus for pumping a liquid, and relates in particular to apparatus for metering a predetermined quantity of a first liquid for mixture with a second liquid.

There are many applications where it is necessary to meter and intermix two liquids or other fluids in some certain predetermined proportion. In the handling and dispensing of beverages, for example, a predetermined quantity of one ingredient such as a beverage concentrate must be intermixed with another ingredient to provide a beverage suitable for consumption. The proportion of concentrate mixed with the carrier or other liquid is usually a fixed proportion in order to maintain the desired taste and other characteristics of the resulting mixed beverage, and even a relatively small departure from the intended proportion of concentrate may produce a significant and easily-detectable departure from the desired taste or appearance of the mixed beverage. For that reason along with others, the ability to provide a consistent and repeatable proportionate mixture of two liquids is most important in the beverage industry. Numerous other instances of commercial or industrial application for metering apparatus will be apparent to those skilled in the art.

Although various types of pumping or dispensing apparatus have been proposed, the liquid metering apparatus of the prior art has proven less than satisfactory for many applications. A simple syphon metering system, depending on the flow of one liquid to provide a reduced pressure for pumping a quantity of a second liquid, makes metering accuracy dependent on velocity and rate of flow, viscosity of the liquids, and on other variables, and has proven difficult to maintain a desired matering proportion with necessary accuracy. While positive-displacement metering apparatus is not new by itself, such apparatus tends to be relatively complex and/or expensive to construct and maintain. Furthermore, positive-displacement liquid pumping apparatus of the prior art generally delivers a fixed volume of pumped liquid with each stroke or cycle of a motor or other driving device, and the volume of pumped liquid can be adjusted, if at all, only with some difficulty or expense.

SUMMARY OF INVENTION

Stated in general terms, the liquid metering apparatus of the present invention includes a motor which is operated in response to the positive displacement of a certain amount of a first or "operating" liquid, and which delivers a fixed yet selectably-variable amount of a second or "working" liquid for each operating cycle of the motor. Stated somewhat more specifically, liquid metering apparatus according to the present invention includes a pump which operates in response to delivery of a certain volume of an operating liquid, and which displaces a selectably variable volume of working liquid for each volume of operating liquid delivered.

The present liquid metering apparatus includes a motor which undergoes an operating cycle in response to delivery of a certain positive volume of operating liquid. Each operation of the motor causes a pump operating member to engage a pumping piston having an effectively variable stroke, so that the volume of working liquid pumped for each operation of the pump operating member is easily adjusted.

Accordingly, it is an object of the present invention to provide an improved liquid metering apparatus.

It is another object of the present invention to provide liquid metering apparatus for delivering a selectably fixed volume of one fluid in response to delivery of a certain volume of another fluid.

It is yet another object of the present invention to provide liquid metering apparatus for delivering a selectably variable volume of working liquid in response to delivery of a fixed volume of operating liquid.

Other objects and advantages of the present invention will become more readily apparent from the following description of disclosed embodiments thereof.

BRIEF DESCRIPTION OF DRAWINGS

FIG. 1 shows a schematic view of metering apparatus according to disclosed embodiments of the present invention.

FIG. 2 is a section view showing a first disclosed embodiment of metering apparatus according to the present invention.

FIG. 3 is a fragmentary section view of the metering apparatus in FIG. 2, showing the shuttle valve in an alternative position.

FIG. 4 is a section view showing an alternative embodiment of metering apparatus according to the present invention.

FIG. 5 is a section view showing the pumping piston of the embodiment in FIG. 4.

FIG. 6 is a section view showing the sleeve shuttle valve of the embodiment in FIG. 4.

DESCRIPTION OF PREFERRED EMBODIMENTS

Turning first to the overall schematic diagram shown in FIG. 1, the metering apparatus according to the present invention is seen to include a metering pump indicated generally at 10, and connected to receive both a source of operating liquid and a supply of working liquid. The operating liquid is identified as water in FIG. 1, and is supplied to the metering pump at the inlet line 11. The working liquid is supplied to the metering pump through the line 15 from a suitable source of pumped liquid. It will be apparent to those skilled in the art, however, that the identification herein of specific liquids is only by way of example, and without limitation as to the particular kind or nature of liquids with which the present metering apparatus can be used.

Each operating cycle of the metering pump 10 causes the displacement of a certain amount of operating liquid such as water, as becomes more apparent below, and the displaced operating liquid exits the metering pump through the line 12 leading to the mixing chamber M. Each amount of working liquid pumped in response to an operating cycle of the metering pump 10 is also directed to the mixing chamber M, by way of the line 13. The two liquids are intermixed in the mixing chamber, and become the pumped mixture delivered along the line 14 for utilization elsewhere. The mixing chamber M can be any chamber or passage that commingles the two liquids passing through the metering pump 10; as is seen below with respect to the embodiment shown in FIG. 4, the mixing chamber may be integral with the metering pump.

Turning now to FIG. 2, there is shown a specific embodiment of metering pump 10 comprising a fluid-operated motor portion 16 and a positive-displacement pump portion 17. The motor portion 16 and the pump portion 17 are shown constructed in separate and separable components for ease of assembly and maintenance, with the two components being interconnected by way of the removable fasteners 18a and 18b.

Turning first to the motor portion 16, a motor housing 19 is provided having an internal cylindrical chamber 20 defining a pump motor cylinder within which the motor piston 21 is received for reciprocation. A suitable fluid seal such as the O-ring 22 is disposed about the periphery of the piston 21, to provide a fluid-tight wiping seal as the motor piston reciprocates within the cylinder 20. The region 23 to the left of the motor piston 21, as viewed in FIG. 2, receives operating liquid to act against the piston, as is pointed out later, while the region 24 to the right of the motor piston receives neither operating liquid nor working liquid and is normally vented to atmosphere.

The motor housing 19 extends a distance to the left of the cylinder 20 to define the valve housing 28, which as illustrated in FIG. 1 may preferably be formed integrally with the remainder of the housing 19 so as to minimize liquid sealing requirements. The valve housing 28 has an internal bore 29 coaxial with the cylinder 20, and of reduced diameter relative to the cylinder. Received within the bore 29 is a cylindrical member 30 comprising a shuttle valve for the operating liquid. The shuttle valve 30 is dimensioned to be freely reciprocable within the bore 29, and the shuttle valve has a pair of adjoining and intersecting indentations 31a and 31b formed on its exterior surface. The indentations 31a and 31b, which may advantageously be provided by a pair of partially-overlapping annular grooves formed about the exterior periphery of the shuttle valve 30, interact with a detent ball 32, urged inwardly against the shuttle valve by the detent spring 33, so as to define and limit two longitudinally-displaced positions which the shuttle valve may occupy within the bore 29. The first or left position of the shuttle valve 30 is shown in FIG. 2, and the second or right position of the shuttle valve is shown in FIG. 3.

An inlet port 37 and an outlet port 38 extend through the valve housing 28 for selective communication with the bore 29. The inlet and outlet ports are spaced apart from each other, and are longitudinally located relative to the two possible longitudinal positions of the shuttle valve 30, so that only one of the two ports is unblocked at either position of the shuttle valve. Thus, the inlet port 37 is unblocked and the outlet port 38 is blocked when the shuttle valve 30 is in the first position shown in FIG. 2; the opposite status of the inlet and outlet ports maintains when the shuttle valve moves to its second position, shown in FIG. 3.

Extending through the interior of the shuttle valve 30 is a hollow passage 41 concentric with the bore 29, and a valve operating rod 42 extends through the passage 41. The valve operating rod 42 is secured to the motor piston 21 for reciprocation in response to piston movement, but the operating rod does not engage the shuttle valve 30. The diameter of the operating rod 42, relative to the diameter of the passage 41 within the shuttle valve, is selected so that a fluid flow channel is defined between opposite ends of the shuttle valve, for a purpose described below.

One end 43 of the operating rod 42 extends a distance to the left of the shuttle valve 30, and a first valve operating compression spring 44 is retained about the operating rod between the end 43 and the left side of the shuttle valve. A second valve operating spring 45 is disposed about the operating rod 42, between the right end of the shuttle valve 30 and the boss 46 extending a distance axially outwardly from the motor piston 21.

The operating rod 42 extends a distance to the right of the motor piston 21, and terminates with a pump operating rod 47 extending into the pump portion 17 of the metering pump 10, described below. A return spring 48 surrounds the operating rod to the right of the motor piston 21, and biases the motor piston to the left as viewed in FIG. 2.

The pump portion 17 has an elongated pump body 50 which, in external configuration, may match the cross-sectional shape of the motor housing 19. One end of the pump body 50 may have an outside diameter of reduced dimension, as shown at 51, to accommodate the open end 52 of the motor housing 19 beyond the region 24 of the motor cylinder 20. An O-ring seal 53 may be fitted between the open end 52 of the motor housing and the region 51 of the pump body 50, although as previously stated neither operating fluid nor working fluid should normally be present within the region 24.

Extending longitudinally through the pump body 50 is a pump bore 55 coaxial with the motor cylinder 20 and with the pump operating rod 47, a portion of which extends a distance into the pump bore. One end of the motor piston return spring 48 is seated within a counterbore 56 of the pump bore 55, confronting the region 24 of the pump cylinder, and a radial bore 57 extends from the counterbore outwardly to the exterior of the pump body 50 to provide an air vent to the region 24 of the motor cylinder 20.

The portion of pump operating rod 47 extending within the pump bore 55 is sized to permit free reciprocation of the operating rod within the pump bore, as the motor piston 21 is driven for reciprocation. A floating pump piston 60 is fitted within the pump bore 55, and is equipped with an O-ring seal engaging the wall of the pump bore. That portion of the pump bore 55 extending from the right of the floating pump piston 60 comprises the pump chamber 64, the right end of which is defined by the end 62 of the piston stroke adjuster 63 which is screwed into a threaded receptacle 65, coaxial with the pump bore 55, formed in the end 66 of the pump body 50. An O-ring seal 67 is provided at the end 62 of the piston stroke adjuster to prevent leakage of working fluid from the pump chamber 64. A compression coil spring 61 within the pump chamber 64 extends between the end 62 of the piston stroke adjuster 63 and the facing end of the floating pump piston 60 at the other end of the pump chamber, tending to bias the floating pump piston toward the pump operating rod 47.

The line 15 supplying pumped liquid to the metering pump 10 communicates with the pump chamber 64 by means of the inlet port 70. A ball check valve 71 contained within the pump body 50, between the inlet port 70 and the line 15, prevents the pumped working liquid in the pump chamber 64 from returning to the line 15.

The output line 13 for the pumped working liquid similarly communicates with the pump chamber 64 by way of a port 72, and a second ball check valve 73 located within the pump body 50 prevents the pumped working liquid from returning to the pump chamber from the output line 13.

The operation of the metering pump embodiment shown in FIGS. 2 and 3 is now described. It is assumed that the shuttle valve 30 and the motor piston 21 are both in their respective left-most positions, that a source of pressurized working liquid is connected to the input port 37 of the motor, and that the inlet line 15 of the pump portion 17 is connected to a suitable supply of working liquid to be pumped. As the operating liquid enters the port 37 and flows through the bore 29 to enter the cylinder region 23, the operating liquid exerts a force moving the motor piston 21 to the right, compressing the return spring 48. The shuttle valve 30 remains in its first position, shown in FIG. 2. The rightward movement of the motor piston 21 carries with it the operating rod 42, causing the first valve spring 44 to compress and exert an increasing force against the left end of the shuttle valve 30 and correspondingly reducing the force of the second valve spring 45 against the right end of the shuttle valve.

When the force exerted on the shuttle valve by the first valve spring 44 exceeds the retaining force of the detent ball 32 against the cam surface 31b, the shuttle valve will suddenly shift to its second position shown in FIG. 3. At that time, the shuttle valve blocks the inlet port 37 and opens the previously-blocked outlet port 38, thus permitting the operating liquid in the region 23 of the motor cylinder 20 to drain along a path including the bore 29, the annular passage between the operating rod 42 and the interior passage 41 of the shuttle valve 30, and the outlet port 38 itself. The motor piston 21 is thus urged leftwardly by the piston return spring 48, causing the piston and the operating rod 42 to return to their initial position while forcing operating liquid out of the cylinder 20.

The leftward or return movement of the motor piston 21, under influence of the piston return spring 48, continues until the second valve operating spring 45 exerts sufficient leftward force against the shuttle valve 30 to return the shuttle valve to its initial position shown in FIG. 2. When that occurs, the operating fluid inlet port 37 is reopened and the motor operating cycle commences to repeat itself.

As the operating rod 47 moves rightwardly during the forward movement of the motor piston 21, the floating pump piston 60 is contacted and moved rightwardly, thereby compressing the spring 61 and reducing the volume of the pump chamber 64. Any working liquid previously in the pump chamber 64 is thereby forced past the check valve 73 and out along the line 13. When the pump operating rod 47 is withdrawn leftwardly by return movement of the motor piston 21, the spring 61 forces the floating pump piston 60 leftwardly to an extent determined by the fully-extended position of the spring, and by the adjustment position of the piston stroke adjuster 63. This spring-induced leftward or return movement of the floating pump piston 60 enlarges the volume of the pump chamber 64, thereby drawing a quantity of working liquid into the pump chamber through the check valve 71 and the inlet port 15. That quantity of working liquid drawn into the pump chamber 64 by the return stroke of the floating pump piston 60 will be ejected from the pump chamber 64 through the line 13, by the next forward stroke of the operating rod 47.

It will be appreciated that the length of the pump chamber 64 swept by the floating pump piston 60 in response to each complete operating cycle of the pump motor 16, and thus the volume of working liquid pumped by each such cycle, is determined by the position of the piston stroke adjuster 63. Moving the end 62 of the piston stroke adjuster further into the pump bore 55 correspondingly moves the floating pump piston 60 closer to the free end of the pump operating rod 47 in its leftmost position, thereby reducing the amount of free or lost motion in bore 55 which the pump operating rod must undergo in its forward stroke before contacting the floating pump piston. The volume of the pump chamber 64 swept by the floating pump piston in response to each stroke of the pump operating rod 47, and thus the volume of working liquid pumped in response to each such stroke, is thus increased. Similarly, rightward movement of the piston stroke adjuster increases the lost-motion space in bore 55 between the pump operating rod 47 and the floating pump piston 60, thereby decreasing the extent of pump piston movement and the volume of pumped working liquid pumped in response to each stroke of the pump operating rod.

It will thus be seen that each complete operating cycle of the motor portion 16 is caused by a certain fixed volume of operating liquid entering the motor, and then passing via line 12 to the mixing chamber M. For each such operating cycle of the motor 16, the mixing chamber M receives a pumped volume of working liquid which remains fixed for each operating cycle, but which is readily adjustable. The proportion of working liquid to operating liquid in the pumped mixture, flowing in the output line 14 from the mixing chamber M, thus is unchanged by flucuations in pressure, flow rate or other parameters of the operating liquid supplied to the motor portion 16, and is determined solely by setting the piston stroke adjuster 63 to provide the desired proportion.

Turning next to FIGS. 4-6, a second embodiment of metering pump is disclosed with primed reference numerals used to designate elements corresponding to like elements in the previously-described embodiment. The metering pump 10' includes both a motor portion 16' and a pump portion 17' whose construction and operation are substantially comparable to the preceding embodiment. Moreover, the pumped working liquid is mixed with the operating liquid internally within the metering pump 10', so that no separate mixing chamber M is required for the metering pump shown in FIGS. 4-6.

The metering pump 10' is assembled with two major external components, a cylinder 78 open at one end and a housing 79 also open at one end and telescopically received a distance within the open end of the cylinder. The piston 21' fits within the cylinder 78 for reciprocal movement between the open end of the housing 79 and the closed end 80 of the cylinder; the motor piston thus divides the interior of the cylinder 78 into a region 23' for receiving operating liquid as described below, and a region 24' which is vented to atmosphere through the vent bore 57' formed in the outwardly-extended central portion 81 of the cylinder.

The motor piston 21' is shown in detail in FIG. 5, and includes an operating rod 82 extending axially outwardly from the left face of the piston. The operating rod 82 terminates at the free end 83, and an extension to the left of the free end constitutes the pump operating rod 47'. An annular groove 86 extends around the periphery of the operating rod 82, spaced a short distance to the right of the free end 83.

A coaxial bore 87 is formed in the right surface 88 of the piston 21', and extends a distance inwardly into the operating rod 82. This bore 87, as seen in FIG. 4, accommodates one end of the piston return spring 48', the other end of which is positioned in a confronting recess within the closed end 81 of the cylinder 78. The interior of the operating rod 82 includes a coaxial second bore 89 of reduced diameter from the bore 87, and a coaxial third bore 90 of reduced diameter relative to the second bore. The interface 91 between the second and third bores is formed with a concave shape to provide a seat for the ball check valve 92, FIG. 4. A fourth coaxial bore 93 communicates with the third bore 90 through the remaining length of the operating rod 82, and thence through the interior of the pump operating rod 47' to communicate with the free end 94 of the pump operating rod.

Extending leftwardly from the closed end 98 of the housing 79 is an extension 99 containing a longitudinal bore 100 coaxial with the hollow interior of the cylinder 78. The bore 100 has a portion of somewhat enlarge diameter to constitute the pump chamber 64', communicating with the hollow interior 101 of the housing 79. The pump operating rod 47' of the motor piston 21', in assembly as seen in FIG. 4, extends a distance into the pump chamber 64', and an O-ring seal 102 surrounding the exterior of the pump operating rod provides a liquid-tight seal between the pump chamber 64' and the interior 101 of the housing 79.

Received within the bore 100 of the extension 99 is the floating pump piston 60', having a free end confronting the end 94 of the pump operating rod 47' within the pump chamber 64'. The other end of the floating pump piston 60' contacts a compression spring 61', located in the bore 100 between the floating pump piston and the piston stroke adjuster 63' screwed into a threaded opening in the end 103 of the extension 99.

The input line 11' for the motor operating liquid is attached to the exterior of the cylinder 78, in fluid communication with an annular channel 106 formed about the interior of the cylinder. The channel 106 is aligned with fluid flow ports collectively designated 107 in the housing 79, to allow operating liquid to flow from the line 11' into the cylinder region 23'. The fluid flow ports may be provided by a plurality of radial holes drilled through the wall of the housing 79 at equidistant circumferential spacing about the housing. Another annular channel 108 is formed in the interior of the cylinder 78, longitudinally spaced from the channel 106 and toward the open end of the cylinder. A corresponding series of fluid flow ports 109 is formed in the wall of the housing 79 in alignment with the channel 108, and the ports 109 may likewise be provided by a number of radial holes bored in the housing wall at equidistance circumferential spacing.

Slidably received within the interior of the housing 79, in close proximity to the inside surface 112 thereof, is the shuttle valve 30' shown in assembly in FIG. 4, and shown separately in FIG. 6. The shuttle valve 30', like its counterpart 30 in the preceding embodiment, is maintained in either of two positions by the detent ball 32', and is longitudinally dimensioned to block fluid flow either from the ports 107 or 109, depending on the position of the shuttle valve. The detent ball 32' is spring-biased to engage either of the cam surfaces 31l' or 31b' circumferentially formed about the exterior of the shuttle valve.

A coaxial bore 113 extends through the shuttle valve 30' to accommodate the operating rod 82 of the motor piston 21', and also to define the annular fluid channel 114 (FIG. 4) surrounding the operating rod. The bore 113 through the shuttle valve 30' is counterbored at each end 115a and 115b, and a pair of valve operating springs 44' and 45' extend longitudinally outwardly in opposite directions from the two counterbores. The opposite end of the valve spring 44' engages a spring retainer 116, located adjacent the free end 83 of the operating rod 82 and held on the operating rod by the snap ring 117 received in the annular groove 86 of the operating rod. The other valve spring 45' presses against the confronting face of the piston 21', and is located about the region of enlarged diameter 118 forming a boss joining the operating rod 82 with the piston face.

The ball check valve 92 is retained within the bore 89 of the operating rod 82 by the plug 120, having a stem substantially narrower than the diameter of the second bore. The plug 120 terminates in a head engaging the inner end of bore 87, and there held in place by the piston return spring 48'. The plug 120 locates the ball check valve 92 within the second bore 89, but does not urge that ball against the valve seat 91. Radial fluid passage 121, which may comprise a number of radial holes bored through the operating rod 82, provides a fluid flow passage between the second bore 89 and the channel 114 surrounding the operating rod.

The working liquid to be pumped by the metering pump 10' is supplied through line 15', including a ball check valve 71' to prevent the return of working liquid from the pump chamber 64' to the line 15'. The outlet line 14' communicates with the annular channel 108 formed in the cylinder housing 78.

The operation of the metering pump embodiment shown in FIG. 4 is now discussed, and it will be seen that the operating is substantially similar in many respects to that of the preceding embodiment. Although the shuttle valve 30' is depicted in FIG. 4 midway between its two alternative positions, it is assumed the shuttle valve is initially to the left position allowing pressurized operating liquid to flow through the line 11' and the ports 107 to enter the cylinder region 23', thereby moving the piston 21' to the right against the return force of the piston return spring 48'. The pump operating rod 47' also moves to the right at this time, enlarging the effective volume of the pump chamber 64' and thereby drawing a quantity of working liquid into the pump chamber through the line 15' and the check valve 71'. Check valve 92 is held closed against seat 91 by differential pressure at this time.

Rightward movement of the motor piston 21' continues, compressing the valve operating spring 44' until the force of that spring against the shuttle valve 30' overcomes the retaining force of the detent 32' and moves the shuttle valve to its right-most position. The flow of operating liquid to the piston 21' is then blocked and the ports 109 in the housing 79 are unblocked, allowing the operating liquid in the cylinder region 23' to flow through the annular channel 114 and out of the ports 109 as the piston return spring 48' moves the piston towards its left-most position. Movement of the pump operating rod 47' into the pump chamber 64' causes the working liquid previously drawn into that chamber to flow through the bore 93 in the pump operating rod, past the check valve 92, and through the passages 121 to intermix with the flow of operating liquid passing through channel 114 toward the ports 109 and the exit line 14'. Accordingly, the return movement of the piston 21' causes a predetermined quantity of working liquid, previously pumped into the pump chamber 64', to become mixed with the fixed volume of operating liquid required to move the motor piston in a cycle of operation. The position of the floating pump piston 60', controlled by the piston stroke adjuster 63', determines the volume of working liquid to be pumped and intermixed with the operating liquid, for each complete cycle of the metering pump 10'.

It will be understood that the foregoing relates only to preferred embodiments of the present invention and that numerous changes and modifications may be made therein without departing from the spirit and the scope of the invention as defined in the following claims.

I claim:

1. Positive displacement metering pump apparatus, comprising in combination:

a housing defining a hollow operating chamber for receiving a fluid motor piston, and a hollow discharge region;

means defining a fluid motor piston reciprocably disposed within said operating chamber;

a fluid inlet port receiving operating fluid for admission to said operating chamber to exert force on said fluid motor piston;

a fluid outlet port receiving operating fluid exhausted from said discharge region;

valve means disposed in said housing and movable independently of movement of said fluid motor piston to occupy either a first position or a second position;

said valve means defining a fluid channel connecting said operating chamber and said discharge region;

said valve means in said first position operative to admit said operating fluid to said operating chamber from said fluid inlet port;

said valve means in said second position operative to admit said operating fluid from said discharge region to said fluid outlet port so that the operating fluid previously admitted to the operating chamber can exit the fluid outlet port through said fluid channel and said discharge region; said fluid channel connecting said operating chamber and said discharge region in fluid communication at all times;

actuating means operative to move said valve means from said first position to said second position when said fluid motor piston has moved a first extent in response to said operating fluid entering said operating chamber, and operative to return said valve means to said first position from said second position when said fluid motor piston has moved a second extent in response to said exiting operating fluid, whereby said fluid motor piston undergoes an operating cycle; and pump means operatively associated with said fluid motor piston to pump a certain amount of working fluid in response to each operating cycle of said fluid motor piston.

2. Apparatus as in claim 1, wherein:
said fluid motor piston is operative to undergo a fixed amount of travel in each operating cycle; and
said pump means is operartive to pump a selectably variable certain amount of working fluid in response to each operating cycle.

3. Apparatus as in claim 1, wherein:
said fluid motor piston undergoes a fixed amount of travel in each operating cycle; and said pump means comprises:
a pump chamber;
inlet means operative to admit said working fluid to said pump chamber;
outlet means operative to permit the working fluid to exit said pump chamber;
idler piston means within said pump chamber and disconnected from said fluid motor piston but operative to move within said pump chamber in response to movement of said fluid motor piston; and
means operatively associated with said idler piston means to select the amount of movement said idler piston means undergoes in response to each cycle of said fluid motor piston, so that the amount of working fluid pumped through said outlet means in response to each cycle of the fluid motor piston is correspondingly selected.

4. Apparatus as in claim 3, wherein
said idler piston is disposed for movement a predetermined maximum extent in a forward direction by movement of said fluid motor piston in a first direction;
return means operative to move said idler piston in a return direction when said fluid motor piston moves in a second direction; and
said return means being adjustable to select the amount of return movement of said idler piston, and thereby to adjust the amount of idler piston movement in response to a cycle of said fluid motor piston.

5. Fluid metering pump apparatus, comprising in combination:

a housing defining an operating cylinder for reciprocably receiving a fluid motor piston, and a hollow discharge region;

means defining a fluid motor piston within said cylinder;

valve means coaxial with said motor piston and movable independently of said motor piston to occupy either a first position or a second position;

said valve means defining a fluid channel connecting said cylinder and said discharge region;

said valve means in said first position admitting a volume of operating fluid to said cylinder so as to urge said motor piston in a first direction within said cylinder, and in said second position blocking further inflow of operating fluid and allowing said previously admitted volume of operating fluid to flow from said cylinder;

said fluid channel connecting said operating cylinder and said discharge region in fluid communication at all times;

means urging said motor piston in a second direction within said cylinder so as to expel said volume of operating fluid from said cylinder through said fluid channel and said discharge region when said valve means is in said second position;

actuating means operative to move said valve means to said second position when said motor piston has moved in the first direction in response to a certain volume of operating fluid admitted to said cylinder, and operative to move said valve means to said first position when said motor piston has moved in the second direction to expel said volume of operating fluid, thereby completing an operating cycle of said motor piston;

pump means operatively associated with said motor piston to pump a selectably variable volume of a working fluid in response to each said operating cycle; and means operative to receive and intermix said certain volume of expelled operating fluid and said selectably variable volume of pumped working fluid, so as to deliver a mixture of said two fluids.

6. Apparatus as in claim 5, wherein:
said housing includes a valve chamber coaxial with said cylinder;
said valve means being slidable within said valve chamber to said first and second positions; and
said valve means comprising a sleeve having a hollow interior passage collinear with said motor piston.

7. Positive displacement metering pump apparatus, comprising in combination:
a housing defining a hollow chamber for receiving a fluid motor piston;
means defining a fluid motor piston reciprocally disposed within said chamber;
a fluid inlet port in fluid flow communication with said chamber to admit operating fluid to exert force on said fluid motor piston;
a fluid outlet port in fluid flow communication with said chamber to allow said operating fluid to exit said chamber;
valve means disposed in said housing and movable independently of movement of said fluid motor piston to occupy either a first position or a second position;
said valve means in said first position connecting said chamber with said fluid inlet port so as to admit operating fluid to said fluid motor piston;
said valve means in said second position connecting said chamber instead to said fluid outlet port so that the previously admitted operating fluid can exit said chamber;
actuating means operative to move said valve means from said first position to said second position when said fluid motor piston has moved a first extent in response to said operating fluid, and operative to return said valve means to said first position from said second position when said fluid motor piston has moved a second extent in response to said exiting operating fluid, whereby said fluid motor piston undergoes an operating cycle,
said fluid motor piston undergoing a fixed amount of travel in each operating cycle;
a pump chamber;
inlet means operative to admit said working fluid to said pump chamber;
outlet means operative to permit the working fluid to exit said pump chamber;
idler piston means within said pump chamber and disconnected from said fluid motor piston but operative to move within said pump chamber in response to movement of said fluid motor piston;
means operatively associated with said idler piston means to select the amount of movement said idler piston means undergoes in response to each cycle of said fluid motor piston, so that the amount of working fluid pumped through said outlet means in response to each cycle of the fluid motor piston is correspondingly selected,
said idler piston being disposed for movement a predetermined maximum extent in a forward direction by movement of said fluid motor piston in a first direction;
return means operative to move said idler piston in a return direction when said fluid motor piston moves in a second direction; and
said return means being adjustable to select the amount of return movement of said idler piston, and thereby to adjust the amount of idler piston movement in response to a cycle of said fluid motor piston.

8. Apparatus as in claim 4 or 7, wherein said return means comprises resilient means urging said idler piston a selectably adjustable distance in the return direction.

9. Fluid metering pump apparatus, comprising in combination:
a housing defining a cylinder for reciprocably receiving a fluid motor piston,
said housing including a valve chamber coaxial with said cylinder;
means defining a fluid motor piston within said cylinder;
valve means coaxial with said motor piston and movable independently of said motor piston to occupy either a first position or a second position,
said valve means comprising a sleeve having a hollow interior passage collinear with said motor piston, and
said valve means being slidable within said valve chamber to said first and second positions;
said valve means in said first position admitting a volume of operating fluid to said motor piston so as to urge said motor piston in a first direction within said cylinder, and in said second position blocking further inflow of operating fluid and allowing said previously admitted volume of operating fluid to flow from said cylinder;
means urging said motor piston in a second direction within said cylinder so as to expel said volume of operating fluid from said cylinder when said valve means is in said second position;
actuating means operative to move said valve means to said second position when said motor piston has moved in the first direction in response to a certain volume of operating fluid, and operative to move said valve means to said first position when said motor piston has moved in the second direction to expel said volume of operating fluid, thereby completing an operating cycle of said motor piston;
pump means operatively associated with said motor piston to pump a selectably variable volume of a working fluid in response to each said operating cycle; and
means operative to receive and intermix said certain volume of expelled operating fluid and said selectably variable volume of pumped working fluid, so as to deliver a mixture of said two fluids.

10. Apparatus as in claim 5 or 9, wherein said actuating means comprises:
first resilient means operatively interposed between said motor piston and said valve means to move the valve means to a said second position when the motor piston moves to a certain position in its first direction of movement; and
second resilient means operatively interposed between said motor piston and said valve means to return the valve means to its first position when the motor piston is returned to a certain position by said urging means.

11. Apparatus as in claim 6 or 9, wherein:
said valve chamber is in fluid flow communication with said cylinder for said motor piston; and further comprising
means defining an inlet port for said operating fluid;
said inlet port cooperating with said valve means to admit operating fluid to said cylinder to operate said motor piston when the valve means is in said first position, and being blocked when said valve means in said second position;

means defining an exit port for said operating fluid; and said exit port being in fluid flow communication with said valve chamber and cooperating with said valve means to be open only when the valve means is in its second position;

so that operating fluid can flow from said cylinder to said valve chamber and out said exit port when said valve means is in the second position, thereby allowing said motor piston to move in said second direction in response to said urging means.

12. Apparatus as in claim 11 or 9, wherein:

said valve means sleeve is concentric with an operating member movable with said motor piston;

said operating member passing through said interior passage of the sleeve; and said interior passage comprising said fluid flow communication with said valve chamber and said motor piston cylinder; and said actuating means for said valve means comprises:

first resilient means operatively interposed between said sleeve and said motor piston to urge the sleeve toward said first position with increasing force as the motor piston moves in the first direction;

second resilient means operatively interposed between said sleeve and said motor piston to urge the sleeve toward said second position with increasing force as the motor piston moves in the second direction; and means preventing said sleeve from moving between positions until the urging force reaches a predetermined minimum force.

13. Apparatus as in claim 6 or 9, wherein:

said valve chamber is in fluid flow communication with said motor piston cylinder; and said intermixing means comprises a fluid passageway conducting said pumped working fluid to said valve chamber for intermixture with the operating fluid expelled from said pump motor cylinder.

14. Apparatus as in claim 13 or 9, wherein:

said pump means comprises a pumping chamber, and a pumping member connected to said motor piston and moving in said pumping chamber in response to each operating cycle of the motor piston;

said fluid passageway is in said pumping member so that movement of said pumping member into said pumping chamber forces the working fluid in the pumping chamber to flow through the fluid passageway and thence into said valve chamber.

* * * * *